Sept. 1, 1959     L. R. KIRKPATRICK     2,902,294
TRAILER HITCH
Filed Dec. 7, 1956
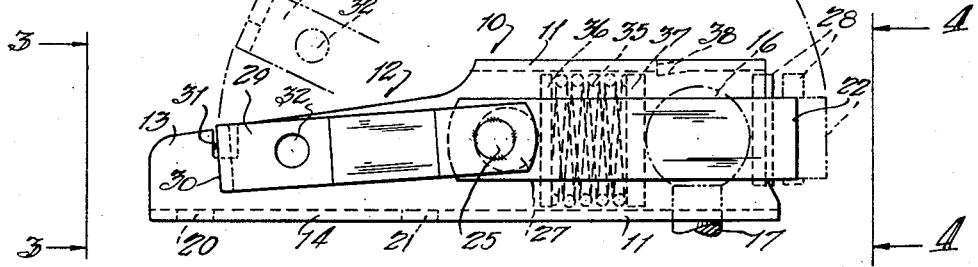
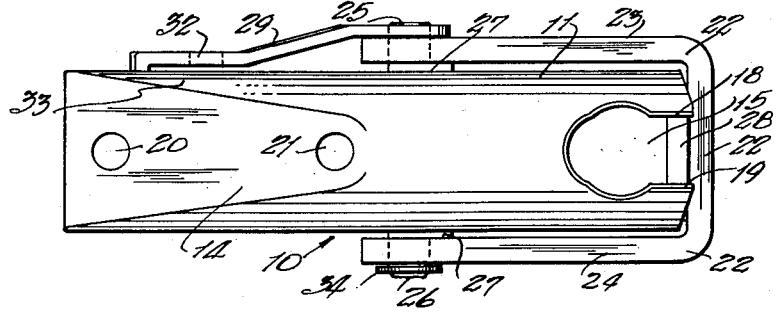
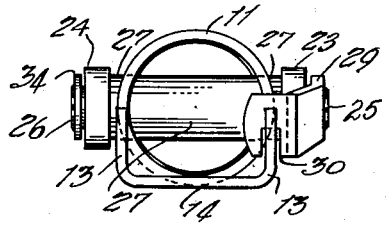 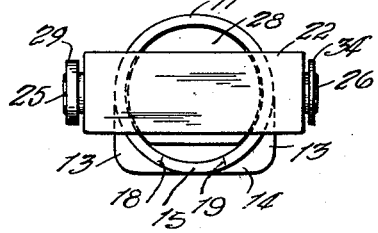
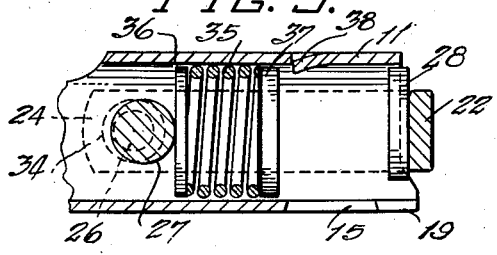
Lawrence R. Kirkpatrick
INVENTOR.
BY
ATTORNEY

United States Patent Office 2,902,294
Patented Sept. 1, 1959

2,902,294

TRAILER HITCH

Lawrence R. Kirkpatrick, Fort Worth, Tex.

Application December 7, 1956, Serial No. 627,029

3 Claims. (Cl. 280—512)

This invention relates to ball-type coupling devices for connecting a trailer, or the like, to a towing vehicle.

One of the principal objects of the invention resides in the provision of a novel means for detachably connecting the ball securely in the socket whereby accidental detachment thereof is practically eliminated.

Another object of the invention is to provide a socket construction whereby the ball may be conveniently and quickly connected therewith or disconnected therefrom without the use of any tools.

A further object of the invention is to provide a socket with an open front portion admitting the ball, the socket having movable retaining means for securing the ball in place in the socket, the said retaining means being normally secured and held against movement.

It is also an object of the invention to provide a ball and socket coupling of the character described having few and simple parts, one which will be practical and durable in normal use and one which may be economically manufactured.

Other objects and advantages will become apparent to those skilled in the art from the following description of the invention and from the accompanying drawing wherein:

Figure 1 is a side elevational view of the invention, with the parts in normal position when the ball and socket are coupled, the ball being indicated in broken lines.

Figure 2 is an inverted plan view of the socket.

Figure 3 is a rear end view of the invention on lines 3—3 of Figure 1.

Figure 4 illustrates the front end view of the invention on lines 4—4 of Figure 1, and Figure 5 is a fragmentary longitudinal sectional view of the rear portion of the invention, showing the eccentric latch and the spring cushioning device.

Continuing with a more detailed description of the drawing, reference numeral 10 indicates a housing which has the form of a cylindrical shell 11 in its forward portion, while the rear portion 12 is of a generally U-shape form in transverse section at 13, as shown particularly in Figure 3, and having a tapered flat bottom 14, as shown in Figures 2, 3 and 4.

The forward portion of the socket member 10 has an opening 15 in the bottom, formed to receive the ball 16 and shank 17 directly from the front, the shank 17 passing between the edges 18 and 19 of the opening 15. Bolt holes 20 and 21 are provided in the bottom 14 for fastening the socket member securely to the vehicle to be towed. A generally U-shape bar, or locking member 22, shown in Figure 2, is formed to embrace the forward portion of the cylindrical shell 11 being pivotally mounted by parallel legs 23 and 24 at their ends on the crankpins 25 and 26 of the crankshaft 27. A discular wear plate 28 is fixed in the heel of the U-bar 22, as shown in Figures 1 and 2, and adapted to enter the forward end of the member 11.

The crankshaft 27, as shown in Figures 1, 2 and 3 extends through the shell 11 of the socket 10, between the inner sides of the members 23 and 24 of the U-bar 22, with the crankpins 25 and 26 connected eccentrically in relation to the major axis of the shaft 27. A lever 29 is fixed to the end of one of these crankpins and has a notched end 30 which extends at right angles from the member 29 and engages a corresponding notch 31 formed in one of the sides of the rear portion 12. An aperture 32 is provided in the lever 29, corresponding with a similar aperture in one of the members 13 for securing the lever 29 in its latched position, as shown in Figures 1 and 3, by any suitable means, such as a padlock, a bolt and nut, a length of wire or device. The lever 29 being fixed to the end of one crankpin, secures one end of the U-bar 22 thereon, while the other end of the U-bar is held in position on its crankpin by the washer 34 welded on the end of said crankpin.

A spring 35, as shown in dotted lines in Figure 1 and in transverse section in Figure 5, with bearing plates 36 and 37 is arranged within the shell portion 11 of the socket member 10 between the crankshaft 27 and the ball 16. The lanced-in portion 38 in the top of the member 11, as shown in dotted lines in Figure 1, defines a stop against which the bearing plate 37 engages when the ball 16 is disengaged from the member 11. In operating the invention the lever 29 is raised upwardly, which moves the U-bar 22 with its wear plate 26 forwardly beyond the front end of the member 11, as shown in dotted lines in Figure 1, whereupon the U-bar 22 may be swung on the crankpins 25 and 26 upwardly to clear the front of the socket member. With a trailer in approximate position behind the towing vehicle and the socket member at the correct height, the towing vehicle may be backed to move the ball into the socket member, this movement being cushioned as the ball meets the spring plate 37. The U-bar 22 should now be returned to the dotted line position shown in Figure 1. Thus the lever 29 should then be returned to its latched position, its movement being indicated in broken lines in Figure 1. This operation moves the U-bar 22 rearwardly, moving the wear plate 28 into the shell 11, and the longitudinal axis of the lever 29 at an angle below the center of the crankshaft 27 which prevents the thrust of the ball against the wear plate 28 from lifting the lever 29. The lever 29 may be further secured by a lock or bolt or other means, so that road shocks would not effect dislodgement thereof in transit.

Manifestly, the structure herein shown and described is capable of certain changes and modifications from time to time, by persons skilled in the art, without departing from the spirit and intent of the invention or the scope of the appended claims.

What is claimed is:

1. In a trailer hitch, a socket device for attachment to a towed vehicle, for engagement with the ball and connecting shank of a ball type connecting member whereby the towed vehicle is connected to a towing vehicle, comprising a housing having a forwardly extending cylindrical portion and a U-shaped rearward portion having a flat bottom, attachable to the towed vehicle, and upstanding sides, the cylindrical portion having an open front end adapted to receive the ball and an opening in its under side adapted to receive the shank, a crank shaft arranged transversely of the housing, intermediate its ends, and extending through side openings therefor in the cylindrical portion, a pair of crank pins extending longitudinally from the ends of the crank shaft and positioned eccentrically thereof, a U-shaped locking bar having its legs pivotally connected at their ends to the crank pins and movable pivotally to and from a position in which an intermediate portion of the locking bar overlies the front end of the cylindrical portion, while at the same time being movable reciprocally relative to the cylindrical portion upon rotative movement of the crank shaft about its axis, a circular wear plate attached to the intermediate portion of the locking bar and receivable in the front end of the cylindrical portion, and a lever rigidly connected at one end to one of the crank pins and movable pivotally about its connected end whereby the crank shaft is rotatable about its axis.

2. The structure of claim 1, a compression spring arranged concentrically within the cylindrical portion, forwardly of the crank shaft, circular bearing plates in the cylindrical portion adjacent opposite ends of the spring, one of the bearing plates being positioned between the spring and the crank shaft and the other bearing plate being positioned between the spring and the front end of the cylindrical portion and adapted to yieldably engage the ball, and detent means in the cylindrical portion spaced inwardly from its front end for engagement by the last mentioned bearing plate to limit its forward movement in response to the action of the spring.

3. The structure of claim 1, and means for securing the free end of the lever to one side of the housing, rearwardly thereof, whereby the lever is positioned substantially in longitudinal alignment with the locking bar and on the opposite side of the crank shaft therefrom.

References Cited in the file of this patent

UNITED STATES PATENTS

| | | |
|---|---|---|
| 2,086,376 | Bock | July 6, 1937 |
| 2,181,178 | Duncan | Nov. 28, 1939 |
| 2,260,442 | Dollase | Oct. 28, 1941 |
| 2,516,555 | Dear | July 25, 1950 |
| 2,793,881 | Albritton | May 28, 1957 |